Aug. 10, 1926.

LE ROY RUCKEL

WINDSHIELD CLEANER

Filed Oct. 30, 1924

1,595,874

Inventor
Le Roy Ruckel
By
Attorney

Patented Aug. 10, 1926.

1,595,874

UNITED STATES PATENT OFFICE.

LE ROY RUCKEL, OF STAMFORD, CONNECTICUT.

WINDSHIELD CLEANER.

Application filed October 30, 1924. Serial No. 746,851.

My said invention relates to an improvement in windshield cleaners, and it is an object of the same to provide an improved device of this character which shall be simple in construction and which shall be effective to remove dust and moisture whether the latter be in liquid or frozen form.

Figure 1:
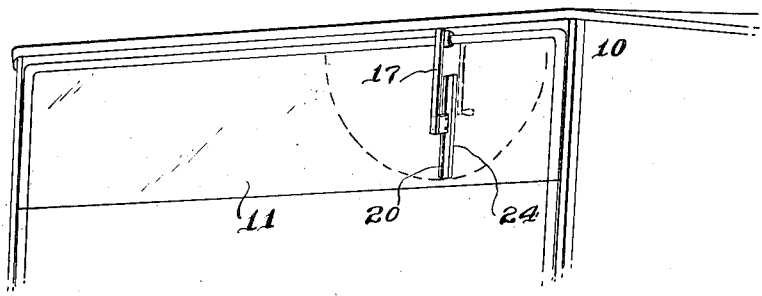
Figure 2:
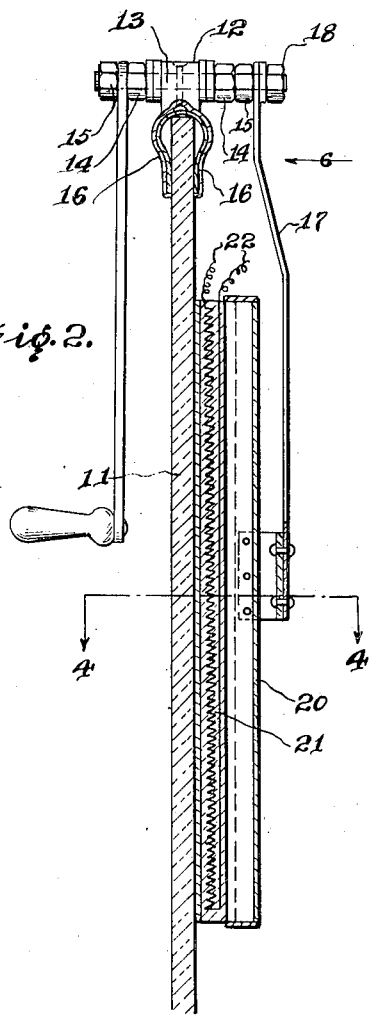
Figure 5:
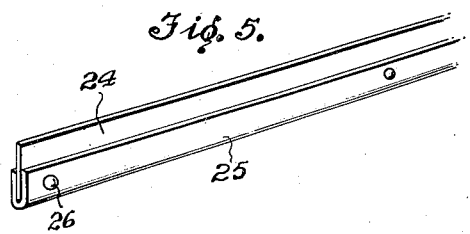
Figure 3:
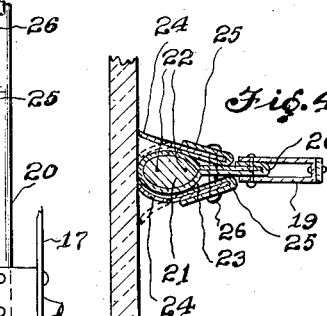
Figure 4:
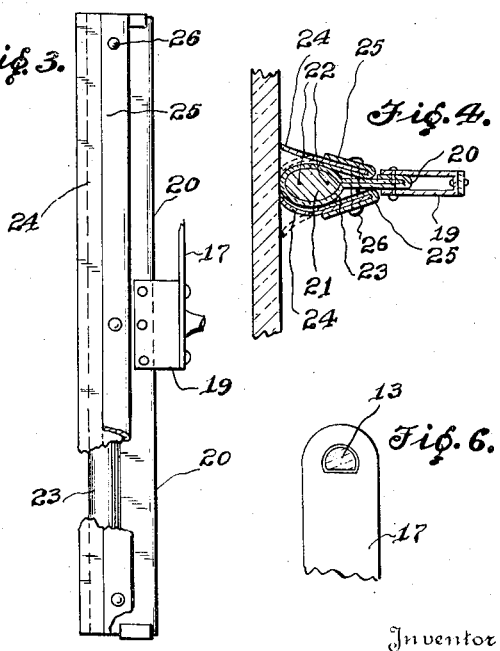

Referring to the accompanying drawings, which are made a part hereof and on which similar reference characters indicate similar parts, Figure 1 is a front elevation of a portion of an automobile or other vehicle;

Figure 2, a vertical cross section of the windshield;

Figure 3, a side elevation of the cleaning element with parts broken away;

Figure 4, a section on line 4—4 of Figure 2;

Figure 5, a perspective of a part of the device; and

Figure 6:
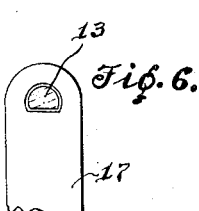

Figure 6, an elevation looking in the direction of the arrow in Figure 2.

In the drawings reference character 10 indicates a portion of the body of an automobile having a windshield 11. A support 12 is provided with a transverse bolt 13 held in place by nuts 14 and lock nuts 15, the support being held in place at the upper edge of the windshield by resilient brackets 16 embracing such upper margin. This construction permits it to be moved along the windshield and placed in the most convenient position for operation. At the outer end of the bolt 13 an arm 17 is secured to the bolt by a nut 18 and this arm at its lower end is provided with a clip 19 embracing the back of a heating element 20, the clip being secured to the support 12 by rivets or other suitable means.

The heating element comprises a core of insulation 21 having embedded therein wires 22, which core is surrounded by a strip of sheet metal 23 bent to fit closely about the core and having parallel rearwardly extending parts, one of which is folded over the other to make a tight joint.

Wipers are secured to the heating element at each side of the parts heretofore described said wipers comprising a flexible strip of rubber 24 held by a U-shaped holder 25 of sheet metal, the wipers being fastened to the parts by means of rivets 26.

In the operation of my device the cleaner arm will be swung in a curve as indicated in dotted lines in Figure 1 and this may be done by means of a handle secured to the bolt 13 or by mechanical means such as are well known to those skilled in the art. If the moisture is frozen on the windshield or if it seems desirable to warm the glass somewhat to hasten evaporation the electric current is turned on in the wires 22 whereby the insulation and the metallic cover are quickly heated so as to transmit heat to the glass. It will be obvious that the flexible rubber wipers will be in the solid line positions indicated in Figure 4 when the wiper moves in one direction and will change to the dotted line positions indicated in the same figure as the wiper is moved in the other directions.

It will be obvious to those skilled in the art that I may modify the device of my invention in various ways without departing from the spirit of the invention, therefore I do not limit myself to the specific embodiment disclosed in the drawings and described in the specification but only as indicated in the appended claims.

Having thus fully described my said invention what I claim as new and desire to secure by Letters Patent is:—

1. A windshield cleaner comprising a wiper arm pivotally secured adjacent the upper margin of the windshield to reciprocate adjacent the front face of the glass, spaced flexible wipers carried by the wiper arm, and heating means, also carried by said arm and interposed between said wipers, substantially as set forth.

2. A windshield cleaner comprising a wiper arm pivotally secured adjacent the upper margin of the windshield to reciprocate adjacent the front face of the glass, a heating element carried by said wiper arm and a wiper element supported by and to one side of said heating element and in substantially parallel and substantially co-extensive relation with said heating element, substantially as set forth.

3. A windshield cleaner comprising a wiper arm pivotally secured adjacent the upper margin of the windshield to reciprocate adjacent the front face of the glass, flattened heating means carried by said wiper arm with the broad cross-sectional dimension thereof at right angles to the windshield glass and a flexible wiper element also carried by said wiper arm said wiper element being substantially co-extensive and substantially parallel with said heating means and secured closely adjacent one flat side thereof, substantially as set forth.

4. A windshield cleaner comprising a wiper arm pivotally secured adjacent the upper margin of the windshield to reciprocate adjacent the front face of the glass, flattened heating means carried by said wiper arm with the broad cross-sectional dimension thereof at right angles to the windshield glass and a flexible wiper also carried by said wiper arm substantially co-extensive with said heating means secured closely adjacent each flat side thereof and substantially parallel thereto whereby when the wiper arm is operated to clean the windshield glass the flattened heating means will serve as a reinforcement for said flexible wipers, substantially as set forth.

In witness whereof, I have hereunto set my hand and seal at Stamford, Connecticut this 30th day of September, A. D. nineteen hundred and twenty-four.

LE ROY RUCKEL. [L. S.]